Dec. 2, 1969  H. H. HOWARD  3,481,473

FILTER SEPARATOR ASSEMBLY

Filed Nov. 14, 1967

INVENTOR.
HERBERT H. HOWARD
BY
Wilson & Fraser
ATTORNEYS

United States Patent Office 3,481,473
Patented Dec. 2, 1969

---

3,481,473
FILTER SEPARATOR ASSEMBLY
Herbert H. Howard, Santa Clara, Calif., assignor to Filters, Inc., San Jose, Calif., a corporation of California
Filed Nov. 14, 1967, Ser. No. 682,939
Int. Cl. B01d 25/00
U.S. Cl. 210—300                              8 Claims

ABSTRACT OF THE DISCLOSURE

A water diverter device for collecting and diverting water from the upper region of a separator element to the bottom of an associated containing vessel, whereby the diverted water is prevented from contacting the lower region of the separating element.

BACKGROUND OF THE INVENTION

In apparatus designed and constructed for the use of purifying fuels used in aircraft engines, for example, it is of utmost importance that the apparatus be effective in filtering and dehydrating such fuels so as to positively assure freedom from failure of engine parts which would cause engine failures or erratic operation, incomplete combustion, corrosion, and undue accumulation of carbon deposits frequently resulting from the presence of sludge and water.

Typically, apparatus designed to achieve the desired objectives of purifying aircraft fuels is comprised of two stages; namely, a coalescing and filtering stage, and a water separating stage. The apparatus is arranged wherein the coalescing and filtering elements and the separating elements are disposed vertically within a corresponding filter separator housing or vessel. The fluid being treated is initially caused to be passed through the coalescing stage which removes particulate contaminants and coalesces any water content therein. Then, the fuel is passed to an outlet through the separating stage which is previous to the fluid being treated and impervious to water and thereby militates against the passage of any water therethrough. The coalesced water content tends to drop, by gravity, to the bottom of the houseing and is suitably discharged therefrom. The size of the overall filter separator apparatus has a certain relationship to the gallon per minute of fluid which may be treated thereby.

In separating water from hydrocarbon fluids, there is a definite relationship between the surface area of the hydrophobic separating media and the velocity of the transient fluid being treated passing across it. In the event the velocity of the transient fluid increases beyond a certain point for a given apparatus, the pressure drop across the media becomes great enough to force small coalesced water droplets therethrough. Accordingly, there must be a sufficiently large area of separating media to separate the water from the fluid for a given flow rate.

Depending upon the rating of the filter separator, the vessel must contain a certain number of square inches of separating area, as well as, a certain number of coalescing elements. The fewer the number of separators that can be empolyed to achieve the desired rating, the smaller the containing vessel.

It has been found that in the operation of filter separator assemblies employing the usual considerably porous separating media for the separating elements, the velocity of the fluid passing through the elements adjacent the outlet was very high. In this high velocity zone, a pressure drop was established which was above the maximum pressure drop for restricting the flow of water through the separating media and caused a "break-through" of water through the separating element. The practice typically followed to overcome this problem has been to introduce a sufficient amount of additional separating media to reduce the velocity of the fluid across the entire outlet outer surface of the separator elements to an acceptable limit whereby all water would be satisfactorily blocked thereby. Obviously, the additional separating media require the corresponding larger vessel.

Further, it has been found that the "break-through" problem in the region of the lower portion of the separator element adjacent to the outlet has been amplified by the fact that there is more water content in contact with the separating media in this lower region of the separating element. Manifestly, this is occasioned by the fact that the coalesced water droplets contacting the upper region of the separating elements must traverse the entire length of the separating element in its downward travel toward the sump of the containing vessel. Accordingly, during the operation of the filter separator assembly there is generally a greater water content in the lower region of the separating media than in the upper region, thereby establishing a great likelihood of water being forced through the separating element in the lower region rendering the filter separator assembly ineffective.

It is an object of the present invention to improve the water separating rating of a filter separator by diverting the flow of water collected by the upper region of the separating separator element and causing it to flow to the region of the filter separator sump without contacting the separating media of the lower region of the element.

SUMMARY

The present invention effectively achieves the above, as well as other, objects by providing a filter separator assembly for removing contaminants from fluids containing a water content including a vessel having an inlet and an outlet, a filtering and coalescing stage between the inlet and the interior of the vessel, and a separating stage between the interior of the vessel and the outlet, the improvement comprising: at least one separating element in the separating stage, and the separating element including a separating media which is pervious to hydrocarbon fluids and substantially impervious to water; and means for collecting water collected at the upper region of the separating element and diverting the same to the bottom of the vessel so as to prevent such water contact from contacting the lower region of the separating element.

BRIEF DESCRIPTION OF THE DRAWINGS

The above objects and advantages of the invention will become readily apparent to one skilled in the art from reading the following detailed description of the embodiment of the invention when considered in the light of the accompanying drawings, in which.

DESCRIPTION OF THE PREFERRED EMBODIMENT OF THE INVENTION

Figure 1:
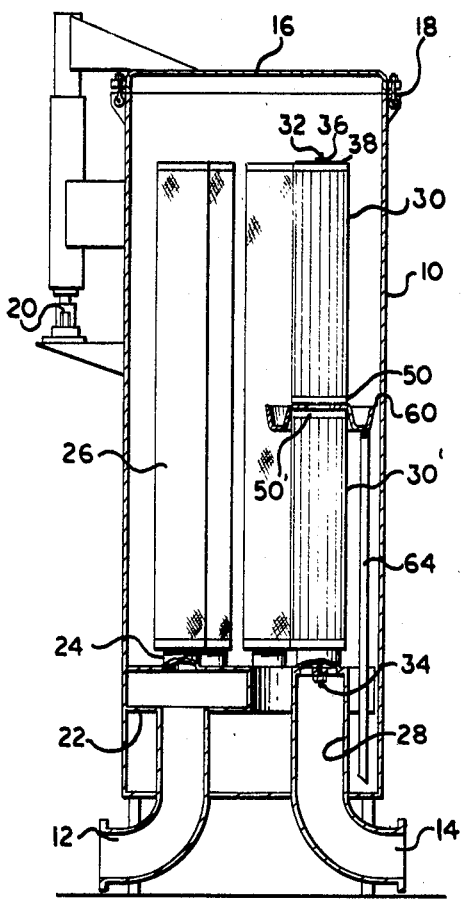
FIGURE 1 is an elevational sectional view of a filter separator assembly incorporating the apparatus of the invention.
Figure 2:
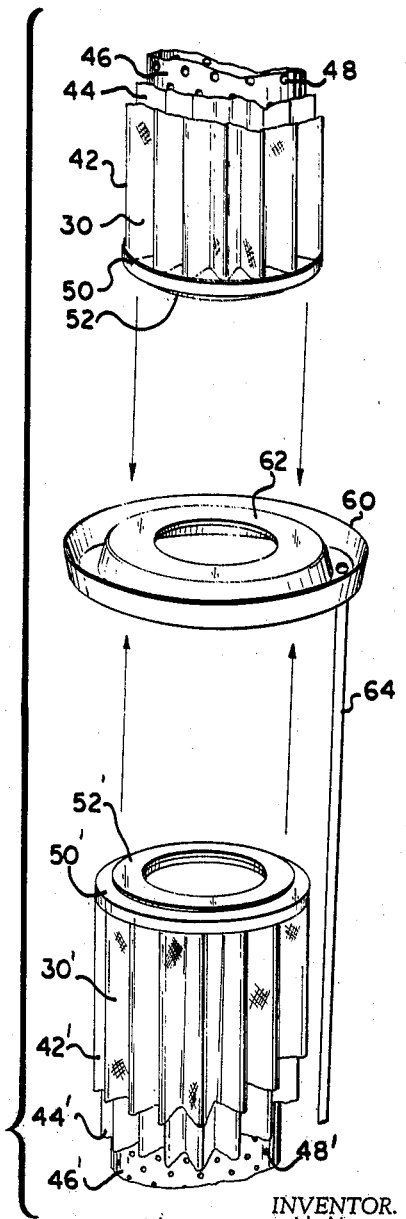
FIGURE 2 is an enlarged fragmentary perspective view of the water collecting and diverting means disposed between the upper and lower separating elements.

Referring to the drawings, there is illustrated a filter separator assembly including a vertically extended cylindrical vessel or container 10 having an inlet port 12 and an outlet port 14 disposed at the bottom of this vessel. The open top of the vessel 10 is provided with a top closure lid 16 which is fastened to the vessel by means of a plurality of swing bolt units 18. When the swing bolt units 18 are loosened, the lid 16 may be lifted and swung away from the vessel by the lid lifting device 20 to provide ready access to the interior of the vessel. At the bottom of the vessel 10, there is an inlet manifold 22 in fluid communication with the inlet port 12 and provided with the plurality of upstanding externally threaded nipples 24. The externally threaded nipples 24 threadably received the internally threaded end cap members of a plurality of upstanding cylindrical filter and coalescer cartridges 26.

Adjacent the inlet manifold there is disposed an outlet pipe 28 in fluid communication with the outlet port 14. A pair of upstanding cylindrical separator elements 30 and 30' is suitably bolted together in the axial alignment in fluid communication with the outlet pipe 28 by means of an elongate bolt 32 which extends through a spider element 34 in the open end of the pipe 28 and then through the hollow interior of the separator elements 30 and 30' and has a threaded nut 36 at the upper extremity thereof. The nut 36 suitably secures an end plate 38 against gasket means at the top of the upper separator 30, and holds the assembly of separator elements 30 and 30' in liquid-tight sealing relation with the upper open end of the outlet pipe 28.

The vessel or container 10 is supported by any suitable legs 40 secured to the exterior of the vessel in any well known manner.

The filtering and coalescing cartridges 26 are preformed and typically are comprised of a convolute tube or cylinder of fiber glass material bonded together by a resin binder. The fiber glass cylinder is then provided with a closed plastic end cap at the top and a hollow internally threaded end cap at the bottom. The cartridges 26 are typically designed for inside-out flow of the fluid being treated.

The separator elements 30 and 30' are of substantially identical construction and are typically formed of outer layers 42 and 42', respectively, of a pleated screen material of a mesh between 100 and 600 rating and coated with a hydrophobic material such as, for example, a fluorocarbon plastic. The outer surfaces of the layers 42 and 42' are in communication with the interior of the vessel 10. Spaced slightly inwardly of the layers 42 and 42' of coated screen material, there are second layers 44 and 44', respectively, of pleated screen material typically of the substantially greater mesh size then the screen material of the layers 42 and 42'. The layers 44 and 44' are employed in the operation of the separator elements to militate against any tendency of the outer layers 42 and 42' to collapse. Spaced inwardly of the layers 44 and 44' are perforated metal tubes 46 and 46', respectively, having a plurality of holes 48 and 48', respectively, formed throughout the entire surface thereof. The holes 48 and 48' are typically graded from a size having a relatively small diameter adjacent the lower terminal ends thereof to a larger diameter adjacent the opposite end. Clearly it will be observed that the holes 48' adjacent the uppermost end of the separator 30' are slightly smaller then the holes 48 in the lower portion of the upper separator element 30. It has been found that if the combined length of the separator elements 30 and 30' were of the order of magnitude of thirty-six inches in length and six and one half inches in diameter, the holes 48 and 48' would be graded from a small size of .09 inch to a large size of .30 inch starting from the bottom of the separator element 30' to the top of the separator element 30. The innerfaces of the perforated tubes 46 and 46' are in communication with the outlet port 14.

The lower end of the separator element 30 is provided with an annular end cap 50, while the upper end of the separator element 30' is provided with an annular end cap 50' which is secured to the respective ends of the assembly of the screen layers and the center tubes. The exposed ends of the end caps 50 and 50' are provided with annular gaskets 52 and 52', respectively.

In the assembled condition, an annular trough-like member 60 provided with a radially inwardly extending flat annular portion 62 is interposed between the lower end of the upper separator 30 and the upper end of the lower separator 30' whereby the respective gaskets 52 and 52' are in liquid-tight sealing relation with the upper and lower surfaces in order of the flat annular portion 62. As is clearly shown in FIGURE 1, in order to provide a fluid conduit between the bottom of the trough-like member 60 and the bottom of the vessel 10, there is provided a depending conduit 64 which may be a metal or a plastic tubing.

In operation, the influent to be treated is directed into the system through the inlet port 12 and then the influent, which is typically an emulsion of hydrocarbon fuel and water, is directed into the inlet manifold 22, and then into the interior of the filtering and coalescing cartridges 26. As the fluid flows through the fibrous media of the cartridges 26, particulate contaminants are trapped herein and the fuel and water emulsion is broken down and the water content is coalesced into small water droplets. The small water droplets tend to gravitate toward the bottom of the vessel 10 and are there discharged through a suitable drain. The fluid is directed into the interior of the vessel 10 and thence to the separating elements 30 and 30'. The screen layers 42 and 42', being substantially pervious to hydrocarbon fluid and impervious to water, will allow the clean dry fluid to pass through the screened layers 42 and 42' while militating against the passage of water droplets which may or may not have dropped to the bottom of the vessel 10 and have been carried by the transient fluid to the screen layers 42 and 42' of the separator elements 30 and 30', respectively. It will be appreciated that the clean dry fluid passes through the screens' layers 44 and 44', through the perforations in the tubes 46 and 46' and thence to the outlet port 14 through the outlet pipe 28.

During the operation, the coalesced water droplets which contact the screen layer 42 of the upper separator element 30 tend to drop slowly downwardly, by gravity, and are collected in the trough-like element 60 and caused to pass through to the bottom of the vessel 10 through the pipe or conduit 64. Thus, the water droplets which have been stopped by the upper separator element 30 will not come in contact with the separator element 30' before being deposited in the sump portion of the vessel 10. It has been found in practice that the use of the collecting and diverting trough-like member 60 has increased the operative capacity of the filter separator assembly.

It should be noted that the above description had described the layers 42, 42', 44, and 44' as being pleated; however, the screen layers may be formed cylindrically with the result in effect of a reduced capacity element.

It has been found that by employing a means, such as the perforated center tubes 46 and 46' to resist the flow of fluid through the separator elements 30 and 30' provides a substantially uniform distribution of flow of fluid thereacross. Accordingly, the pressure drop across or along the entire length of the separator media is controlled to be substantially equal thereby militating against an unduly high pressure drop near the outlet of the assemblage which could cause the passage of water through the separator and thereby decreases the efficiency and effectiveness of the assemblage.

While the above description has made reference to the employment of two separate separating elements 30 and 30', with the collecting and diverting trough-like member 60 interposed therebetween, it will be appreciated that a single separator element could be used with a collecting and diverting trough interposed between the ends thereof.

What I claim is:

1. In a filter separator assembly for removing contaminants from fluids containing a water content including a vessel having an inlet and an outlet, a filter, and coalescing stage between the inlet and the interior of the vessel, and a separating stage between the interior and the outlet, the improvement comprising:

at least one separating element in the separating stage, said element including a separating media pervious to hydrocarbon fluids and substantially impervious to water; and means for collecting water collected at the upper region of said separating element and diverting the same to the bottom of the vessel so as to prevent such water content from contacting the lower region of said separating element.

2. The invention defined in claim 1 wherein said separating element is cylindrical.

3. The invention defined in claim 2 wherein said means for collecting water comprising a trough-like member surrounds a portion of said separating element.

4. The invention defined in claim 3 wherein said trough-like member is provided with a fluid conducting tubular member providing fluid communication with the bottom of the vessel.

5. The invention defined in claim 1 wherein said separating element is comprised of two cylindrical sections in axial alignment and having one of their respective ends adjacent one another.

6. The invention defined in claim 5 wherein said means for collecting water comprising an annular trough-like member of a slightly greater outer diameter than the outside diameter of said separating element.

7. The invention defined in claim 6 wherein said trough-like member includes a radially inwardly extending portion which is contained between said adjacent ends of said cylindrical sections.

8. The invention defined in claim 7 wherein said trough-like member is provided with a fluid conducting tubular member providing fluid communication with the bottom of the vessel.

References Cited

UNITED STATES PATENTS

| | | | |
|---|---|---|---|
| 2,707,563 | 5/1955 | Kasten et al. | 210—301 |
| 2,766,890 | 10/1956 | Kasten | 210—183 |
| 2,919,030 | 12/1959 | Grant et al. | 210—299 X |
| 3,088,592 | 5/1963 | Clark | 210—114 |

REUBEN FRIEDMAN, Primary Examiner

F. A. SPEAR, Jr., Assistant Examiner

U.S. Cl. X.R.

210—316, 335